United States Patent
Fukuda et al.

(10) Patent No.: US 8,642,972 B2
(45) Date of Patent: Feb. 4, 2014

(54) NEUTRON SCINTILLATOR AND NEUTRON DETECTOR

(75) Inventors: Kentaro Fukuda, Shunan (JP); Sumito Ishizu, Shunan (JP); Noriaki Kawaguchi, Shunan (JP); Toshihisa Suyama, Shunan (JP); Akira Yoshikawa, Sendai (JP); Takayuki Yanagida, Sendai (JP); Yui Yokota, Sendai (JP)

(73) Assignees: Tokuyama Corporation, Shunan-Shi (JP); Tohoku University, Sendai-Shi (JP)

( * ) Notice: Subject to any disclaimer, the term of this patent is extended or adjusted under 35 U.S.C. 154(b) by 0 days.

(21) Appl. No.: 13/695,088

(22) PCT Filed: Apr. 26, 2011

(86) PCT No.: PCT/JP2011/060170
§ 371 (c)(1),
(2), (4) Date: Oct. 29, 2012

(87) PCT Pub. No.: WO2011/136224
PCT Pub. Date: Nov. 3, 2011

(65) Prior Publication Data
US 2013/0043402 A1    Feb. 21, 2013

(30) Foreign Application Priority Data

Apr. 30, 2010  (JP) .................................. 2010-105645

(51) Int. Cl.
*G01T 3/06*    (2006.01)
(52) U.S. Cl.
USPC .................................................. 250/390.11
(58) Field of Classification Search
USPC .................................................... 250/390.11
See application file for complete search history.

(56) References Cited

U.S. PATENT DOCUMENTS 6,140,651 A  *  10/2000  Justus et al. .............. 250/390.11
2003/0178574 A1 *  9/2003  Wallace et al. .......... 250/390.11

FOREIGN PATENT DOCUMENTS

JP    2008-116462 A    5/2008

OTHER PUBLICATIONS

A. Chouiyakh, et al., "Thermoluminescence properties of CaF2-LiF:Mn eutectic melt grown composites", Phys. Chem. News, vol. 13, 2003, pp. 139-143.
International Search Report for PCT/JP2011/060170 mailed on May 31, 2011.
Joanna Trojan-Piegza et al., "CaF2(Eu$^{2}$+):LiF • Structural and spectroscopic properties of a new system for neutron detection", Radiation Measurements, vol. 45, 2010, pp. 1-5.
N.J. Rhodes, et al., "Pixelated neutron scintillation detectors using fibre optic coded arrays", Nuclear Instruments and Methods in Physics Research, A392, 1997, pp. 315-318.

* cited by examiner

*Primary Examiner* — Marcus Taningco
(74) *Attorney, Agent, or Firm* — Birch, Stewart, Kolasch & Birch, LLP (57) ABSTRACT

[Problems to be Solved] A neutron scintillator excellent in neutron detection efficiency and n/γ discrimination ability, and a neutron detector using the neutron scintillator are provided.
[Means to Solve the Problems] A neutron scintillator comprising a eutectic body composed of laminar lithium fluoride crystals and laminar calcium fluoride crystals alternately arranged in layers, the thickness of the lithium fluoride crystal layers in the eutectic body being 0.1 to 5 μm; or a neutron scintillator comprising a eutectic body composed of laminar lithium fluoride crystals and laminar calcium fluoride crystals alternately arranged in layers, the calcium fluoride crystal layers in the eutectic body being linearly continuous in at least one direction; and a neutron detector basically constructed from any of the neutron scintillators and a photodetector.

11 Claims, 6 Drawing Sheets

→ SOLIDIFICATION DIRECTION

→ SOLIDIFICATION DIRECTION

→ SOLIDIFICATION DIRECTION

Fig. 11

NEUTRON SCINTILLATOR AND NEUTRON DETECTOR

TECHNICAL FIELD

This invention relates to a neutron scintillator comprising a eutectic body, and a neutron detector composed of the neutron scintillator and a photodetector. More specifically, the invention relates to a neutron scintillator comprising a eutectic body in which laminar lithium fluoride crystals and laminar calcium fluoride crystals are arranged in layers with a specific structure.

BACKGROUND ART

Neutron detectors are an elemental technology supporting neutron application technologies. With the progress of the neutron application technologies in scientific research fields such as structural analyses by neutron diffraction, nondestructive inspection fields, or security fields such as cargo inspection, there is a demand for a neutron detector which achieves higher performance.

Main performances demanded of the neutron detector are the detection efficiency and the count rate of neutrons, and the ability to discriminate between neutrons and gamma rays (may hereinafter be referred to as n/γ discrimination ability). The detection efficiency means the ratio of the number of radiations counted by the detector to the number of radiations emitted from a radiation source and entered into the detector. The count rate means the number of radiations counted per unit time. Gamma rays are generated when neutrons hit an element contained in a constituent member of a detection system for detecting neutrons, or in an object to be tested, such as Fe (iron), Pb (lead), Cd (cadmium), C (carbon) or N (nitrogen). If the n/γ discrimination ability is low, therefore, a signal which does not reflect the interaction between neutrons and the object to be tested enters, and a so-called background noise increases.

Neutrons have a high permeability to pass through a substance without doing any interaction in the substance. Therefore, a nuclear reaction for promptly converting neutrons into charged particles having energy is generally utilized to detect the neutron beam. For example, a $^3$He detector which detects neutrons by utilization of protons or tritons generated by a nuclear reaction between helium-3 ($^3$He) and neutrons has so far been known. This detector has high detection efficiency and excellent n/γ discrimination ability, but has posed the problem of a limited count rate. Moreover, helium-3 is an expensive substance and its resources are limited.

Recently, the development of a detector using a neutron scintillator, instead of the above-mentioned $^3$He detector, has been underway in an attempt to obtain an inexpensive and upsized detector. The neutron scintillator refers to a substance which, when hit by neutrons, absorbs the neutrons to emit fluorescence. The aforementioned various performances of a neutron detector using this scintillator depend on a substance constituting the scintillator. For example, the magnitude of the light emission intensity of the scintillator or variations in its light emission intensity affect discrimination from a background noise. Since the background noise is mainly ascribed to gamma rays, the n/γ discrimination ability is influenced. The decay time of fluorescence influences the count rate.

LiF/ZnS has been used as a neutron scintillator having a relatively high neutron detection efficiency and excellent n/γ discrimination ability (see Non-Patent Document 1). Since the LiF/ZnS is opaque, however, an increase in its thickness has made it impossible to take out scintillation light (scintillation) efficiently. Thus, the LiF/ZnS has been limited in the improvement of neutron detection efficiency.

In view of such problems, a proposal has been made for a neutron scintillator using a eutectic body composed of europium-containing calcium fluoride crystals and lithium fluoride crystals (see Non-Patent Document 2). This neutron scintillator is translucent, and enables scintillation light to be collected efficiently. Thus, this neutron scintillator can achieve a very high neutron detection efficiency. According to studies by the inventors of the present invention, however, the neutron scintillator at issue involves great variations in the brightness of scintillation light when detecting neutrons, and thus has posed difficulty in discriminating between neutrons and gamma rays.

As a eutectic body similar to the eutectic body constituting the neutron scintillator of the present invention, a disclosure is made of a eutectic body having manganese incorporated into a eutectic body composed of lithium fluoride crystals and calcium fluoride crystals (see Non-Patent Document 3). The eutectic body is described as being intended for the development of a dosimeter utilizing thermoluminescence phenomena, and the thickness of laminar lithium fluoride crystal layers is described as about 5 μm. However, the details of the layered structure of the eutectic body remain unknown. Nor has any study been conducted on the application of the eutectic body as a neutron scintillator, and no findings have been presented in connection with the thickness of the crystal layers and the layered structure preferred for a neutron scintillator.

PRIOR ART DOCUMENTS

Non-Patent Documents

Non-Patent Document 1: N. J. Rhodes, et al., "Pixelated neutron scintillation detectors using fibre optic coded arrays", Nuclear Instruments and Methods in Physics Research, A392, 315-318 (1997).

Non-Patent Document 2: Joanna Trojan-Piegza et al., "$CaF_2$ ($Eu^{2+}$):LiF—Structural and spectroscopic properties of a new system for neutron detection", Radiation Measurements, 45, 163-167 (2010).

Non-Patent Document 3: A. Chouiyakh, et al., "Thermoluminescence properties of $CaF_2$—LiF:Mn eutectic melt grown composites", Phys. Chem. News, 13, 139-143 (2003).

SUMMARY OF THE INVENTION

Problems to be Solved by the Invention

It is an object of the present invention to provide a neutron scintillator excellent in neutron detection efficiency, count rate, and n/γ discrimination ability, and a neutron detector with the neutron scintillator.

Means for Solving the Problems

The present inventors have focused on a neutron scintillator using a eutectic body composed of lithium fluoride crystals and calcium fluoride crystals and, in connection with this neutron scintillator, have conducted various studies in attempts to optimize the layered structure of the eutectic body and improve the characteristics of the eutectic body as a neutron scintillator. As a result, they have found that when the thickness of lithium fluoride crystal layers of the eutectic body is set at 0.1 to 5 μm, variations in the brightness of scintillation light when neutrons are detected can be suppressed, and discrimination between neutrons and gamma rays can be easily made. They have also found that when the eutectic body is configured to have a structure in which the calcium fluoride crystals, one of the components constituting the eutectic body, are linearly continuous in at least one direction, the propagation efficiency of scintillation light increases along the direction of the linearly continuous crystals. These findings have led them to accomplish the present invention.

That is, according to the present invention, there is provided a neutron scintillator comprising a eutectic body composed of laminar lithium fluoride crystals and laminar calcium fluoride crystals alternately arranged in layers, wherein the thickness of the lithium fluoride crystal layers in the eutectic body is 0.1 to 5 μm.

According to the present invention, there is also provided a neutron detector equipped with the above neutron scintillator and a photodetector.

In the invention of the neutron detector, it is preferred the photodetector be a position-sensitive photodetector.

According to the present invention, moreover, there is provided a neutron scintillator comprising a eutectic body composed of laminar lithium fluoride crystals and laminar calcium fluoride crystals alternately arranged in layers, wherein the calcium fluoride crystal layers in the eutectic body are linearly continuous in at least one direction.

According to the present invention, there is also provided a neutron detector equipped with the above neutron scintillator and a photodetector.

In the invention of the neutron detector, it is preferred 1) that the photodetector be disposed at an end, in a linear direction, of the linearly continuous calcium fluoride crystal layers; and 2) that the photodetector be a position-sensitive photodetector.

Furthermore, according to the present invention, there is provided a neutron scintillator comprising a eutectic body composed of laminar lithium fluoride crystals and laminar calcium fluoride crystals alternately arranged in layers, wherein the thickness of the lithium fluoride crystal layers in the eutectic body is 0.1 to 5 μm, and the calcium fluoride crystal layers are linearly continuous in at least one direction.

According to the present invention, there is also provided a neutron detector equipped with the above neutron scintillator and a photodetector.

In the invention of the neutron detector, it is preferred 3) that the photodetector be disposed at an end, in a linear direction, of the linearly continuous calcium fluoride crystal layers; and 4) that the photodetector be a position-sensitive photodetector.

Effects of the Invention

According to the present invention, a neutron scintillator having high neutron detection efficiency and excellent n/γ discrimination ability can be provided. A neutron detector using such a neutron scintillator can be preferably used in scientific research fields such as structural analyses by neutron diffraction, nondestructive inspection fields, or security fields such as cargo inspection.

MODE FOR CARRYING OUT THE INVENTION

One of the neutron scintillators of the present invention comprises a eutectic body characterized by the thickness of its crystal layer. This eutectic body comprises two types of crystal phases including laminar lithium fluoride (LiF) crystals and laminar calcium fluoride ($CaF_2$) crystals in a phase-separated form. The thickness of the LiF crystal layer is 0.1 to 5 μm.

The eutectic body functions as a neutron scintillator by emitting scintillation light based on the following course upon entry of neutrons. First, when neutrons are incident on LiF, the neutrons are captured by $^6$Li-isotope in the LiF, whereby a capture reaction takes place to generate secondary particles, i.e., α particles and tritium. Then, such secondary particles migrate in the eutectic body, reaching $CaF_2$ and exciting $CaF_2$. Finally, the excited $CaF_2$ emits scintillation light. That is, the LiF and $CaF_2$ components of the eutectic body of the present invention function, respectively, as a neutron capturing material and a fluorescent substance emitting scintillation light.

In the above eutectic body, the component ratio between lithium fluoride and calcium fluoride is not limited. However, the preferred component ratio is the lithium fluoride/calcium fluoride ratio=0.8/0.2 (mol/mol) which is the component ratio for the eutectic point composition of lithium fluoride and calcium fluoride. If a molar ratio deviating greatly from the molar ratio corresponding to such a eutectic point component ratio is adopted, there is a possibility that the resulting eutectic body will be considerably cloudy, or that the light emission intensity of scintillation light will decline.

In the eutectic body, the $^6$Li-isotope ratio of LiF is preferably 20 to 99%. By setting the $^6$Li-isotope ratio at 20% or more, the probability for the capture reaction increases to increase the detection efficiency for neutrons. In consideration of the cost concerned with isotope enrichment, on the other hand, the $^6$Li-isotope ratio is preferably set at 99% or less.

In the eutectic body, it is important that the thickness of the laminar lithium fluoride crystal layer is 0.1 to 5 μm. As described above, secondary particles produced upon capture of neutrons in the LiF crystals migrate through the eutectic body, and arrive at the $CaF_2$ crystals. However, their energy is partly lost during the course of their migration. When the LiF crystal layer is thick, therefore, the energy imparted from the secondary particles generated by the nuclear reaction to $CaF_2$ varies greatly, thus leading to great variations in the brightness of scintillation light emitted by $CaF_2$. Investigations by the present inventors have revealed that the thinner the LiF crystal layer, the smaller variations the brightness of scintillation light shows, and that by setting this thickness at 5 μm or less, a neutron scintillator with excellent n/γ discrimination ability can be obtained. Setting the thickness of the LiF crystal layer at less than 0.1 μm is technically difficult, and requires special means. Thus, the lower limit of such a thickness should be 0.1 μm.

The other of the neutron scintillators of the present invention comprises a eutectic body characterized by the continuity of the crystal layers. The eutectic body is composed of two phase-separated crystal phases, i.e., laminar lithium fluoride (LiF) crystals and laminar calcium fluoride ($CaF_2$) crystals. The calcium fluoride crystal layers form layers linearly continuous in at least one direction.

Figure 1:
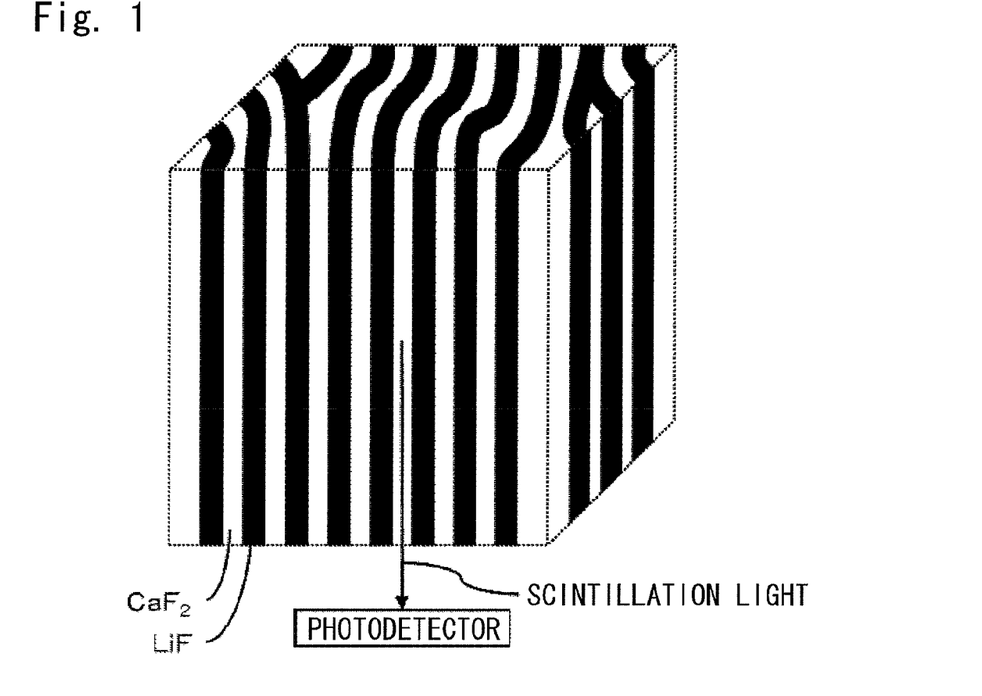
FIG. 1 is a schematic view showing the layered structure of a neutron scintillator according to the present invention.

Generally, in a eutectic body composed of LiF crystals and $CaF_2$ crystals, scintillation light emitted from $CaF_2$ is scattered at the interfaces between the $CaF_2$ crystals and the LiF crystals, and the propagation efficiency of scintillation light to a photodetector lowers. In the neutron scintillator using the eutectic body of the present invention, on the other hand, the propagation efficiency of scintillation light increases in a direction in which the $CaF_2$ crystals are linearly continuous (the direction indicated by an arrow in FIG. 1). By disposing the photodetector at the end in this continuous crystal direction, therefore, it is possible to raise the detection efficiency of scintillation light in the photodetector.

The lithium fluoride/calcium fluoride component ratio, and the $^6$Li-isotope ratio of LiF, of this eutectic body are in conformity with those of the aforementioned eutectic body characterized by the thickness of the lithium fluoride crystal layer. The thickness of the laminar lithium fluoride crystal layer is not limited and, if the calcium fluoride crystal layer has the aforesaid feature, its characteristic effect is exhibited. If the thickness of the laminar lithium fluoride crystal layer is 0.1 to 5 μm, however, the effects due to the features of both crystal layers are synergistically manifested. This is particularly preferred.

The aforementioned two types of eutectic bodies both preferably have at least one element, among elements consisting of Ce, Pr, Nd, Sm, Eu, Gd, Tb, Dy, Ho, Er, Tm and Yb, incorporated as a luminescence center element into the $CaF_2$ crystals. By incorporation of the luminescence center element, the light emission intensity of scintillation light emitted by $CaF_2$ can be enhanced.

The amount of the luminescence center element incorporated into the $CaF_2$ crystals is not limited, but it is preferably 0.05 to 10 mol % with respect to $CaF_2$. The amount of 0.05 mol % or more can enhance the brightness of scintillation light, whereas the amount of 10 mol % or less can avoid problems, such as marked cloudiness of the eutectic body or decline of scintillation light due to concentration quenching.

Methods for producing the aforementioned two types of eutectic bodies used in the present invention are not limited. Generally, there can be employed a method which comprises mixing a powder of lithium fluoride and a powder of calcium fluoride to prepare a material mixture, heating the material mixture to melt it, thereby forming a melt, and then cooling the melt for solidification. In order to control a layered structure (thickness, continuity, linearity), in particular, the unidirectional solidification process for solidifying the melt in one particular direction can be used preferably.

Figure 2:
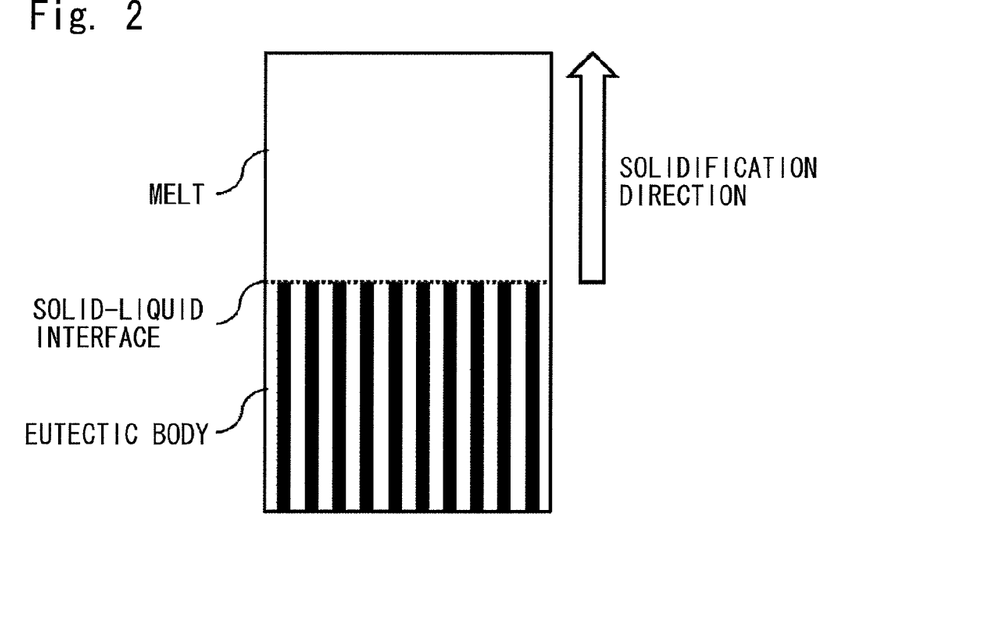
FIG. 2 is a schematic view of the unidirectional solidification process.

The unidirectional solidification process will be illustrated by FIG. 2 taken as an example. A melt is placed inside a furnace body adjusted to a high temperature in its upper portion and a low temperature in its lower portion, and either the melt is lowered, or the furnace body is raised. By so doing, the melt is cooled, beginning at its lower part, and a part thereof below the solidification point solidifies to become a eutectic body. At this time, a solid-liquid interface is formed between the eutectic body and the melt. When the melt is further lowered, or the furnace body is further raised, the solid-liquid interface moves upward and the eutectic body extends. By performing such a procedure continuously, the melt can be solidified in one specific direction. In the present invention, the direction in which the melt is solidified in one specific direction is referred to as a solidification direction, and a rate at which solidification is allowed to proceed is referred to as a solidification rate.

According to the above-mentioned unidirectional solidification process, the thickness of the LiF crystal layer of the eutectic body can be easily decreased by increasing the solidification rate, and a eutectic body having a thickness of the LiF crystal layer of 5 μm or less can be produced efficiently. Moreover, the $CaF_2$ crystals of the eutectic body extend along the solidification direction as shown in FIG. 2, so that a eutectic body comprising $CaF_2$ linearly continuous in one direction can be produced.

Concrete methods illustrating the unidirectional solidification process are: the Bridgman method in which a crucible charged with a melt is placed within a furnace body adjusted to a high temperature in an upper portion thereof and a low temperature in a lower portion thereof, and the crucible is lowered to solidify the melt in one direction from below to above; the gradient freeze method in which a crucible charged with a melt is placed within a furnace body adjusted to a high temperature in an upper portion thereof and a low temperature in a lower portion thereof, cooling is performed, with a temperature distribution being kept to hold the lower portion always at a low temperature, whereby the melt is solidified in one direction from below to above; the Czochralski method in which with a solid-liquid interface being held at a constant position, a eutectic body is pulled up while being solidified in one direction; and the micro-pulling-down method in which with a solid-liquid interface being held at a constant position, a eutectic body is pulled down while being solidified in one direction.

The method for producing the eutectic body used in the present invention will now be described in detail, with the Bridgman method taken as an example.

First, lithium fluoride and calcium fluoride as starting materials are mixed to prepare a material mixture. In incorporating the aforementioned luminescence center element into $CaF_2$, however, a fluoride of the luminescence center element is added to the material mixture, or $CaF_2$ incorporating the luminescence center element beforehand is used instead of the starting material for the calcium fluoride.

The purities of the starting lithium fluoride, the starting calcium fluoride, and the starting fluoride of the luminescence center element are not limited, but are preferably 99.99% or higher. By using the starting materials with such high purities, the characteristics such as the brightness of scintillation light are improved. The starting materials used may be powdery or particulate materials, or may have previously been sintered or melt-solidified.

Then, the material mixture is charged into a crucible, which is installed in a chamber equipped with a heater, a heat insulator, and a vacuum evacuator. Using the vacuum evacuator, the interior of the chamber is evacuated to $1.0 \times 10^{-3}$ Pa or lower. Then, an inert gas such as high purity argon is introduced into the chamber for a gas exchange operation. The pressure within the chamber after the gas exchange operation is not limited, but is generally atmospheric pressure. By this gas exchange operation, water adhering to the starting materials or the interior of the chamber can be removed. Consequently, problems such as decline of scintillation light of the eutectic body, which is ascribed to such water, can be avoided.

To avoid adverse influence due to water which cannot be removed even by the above gas exchange operation, it is preferred to remove water with the use of a scavenger which is highly reactive with water. As such a scavenger, a gaseous scavenger such as tetrafluoromethane can be used preferably. When the gaseous scavenger is used, the preferred method is to mix it with the above-mentioned inert gas and introduce the mixture into the chamber.

After the gas exchange operation is performed, the material mixture is heated by the heater until it is melted. The temperature when melting the material mixture differs according to the chemical composition of the material mixture, but generally, is in the range of 770° C. to 900° C. which is the eutectic point of lithium fluoride and calcium fluoride. The method of heating is not limited, and a high frequency induction heating method or a resistance heating method, for example, can be used as appropriate.

Then, a melt of the molten material mixture is lowered together with the crucible. Since the heater and the heat insulator are arranged so as to be at a high temperature in their upper parts and at a low temperature in their lower parts, the melt solidifies, beginning from below, as it descends. During such solidification, phase separation between LiF crystals and $CaF_2$ crystals occurs, and a eutectic body forms simultaneously with solidification. By further lowering the melt continuously, the melt solidifies unidirectionally from below to above, and the eutectic body extends along the solidification direction. Thus, a eutectic body having $CaF_2$ crystal layers linearly continuous in one direction can be produced.

In the above-described production method, the rate at which to lower the melt, namely, the solidification rate, is not limited, but is preferably 2 to 50 mm/hr. The faster the solidification rate, the thinner the LiF crystal layer becomes. By setting the solidification rate at 2 mm/hr or higher, a eutectic body with the thickness of the LiF crystal layer being 5 μm or less can be produced. If the solidification rate exceeds 50 mm/hr, cloudiness or cracking of the eutectic body may be noticeable. Thus, the solidification rate is preferably set at 50 mm/hr or lower.

A temperature change per unit distance along the solidification direction, namely, a temperature gradient, is not limited, but is preferably 0.5° C./mm or more. By setting the temperature gradient at 0.5° C./mm or more, the unidirectionality of the $CaF_2$ crystal layers can be enhanced. The upper limit of the temperature gradient is not limited, but is generally 10° C./mm or less.

Figure 3:
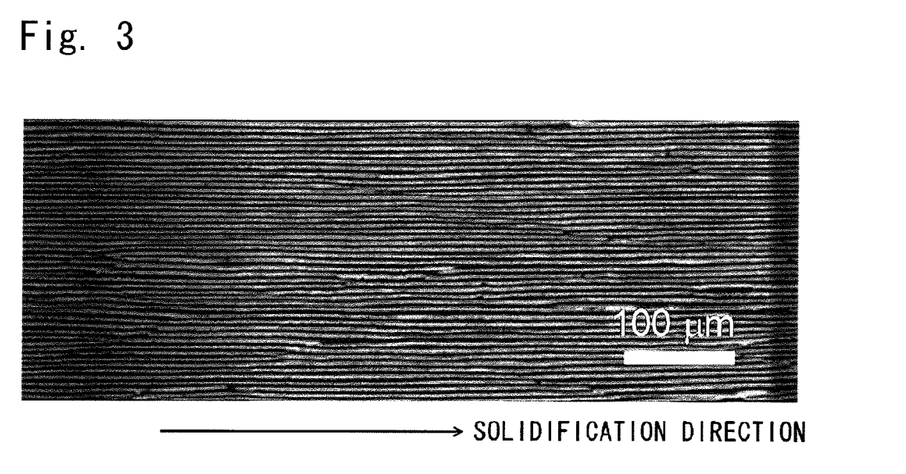
FIG. 3 is a compositional backscattered electron image of a cut surface of a eutectic body obtained in Example 1 when the eutectic body was cut in a direction parallel to a solidification direction.

The layered structure of the resulting eutectic body can be identified by observing a compositional backscattered electron image with the use of a scanning electron microscope (SEM). That is, in the compositional backscattered electron image, the LiF crystal and the $CaF_2$ crystal exhibit a distinct contrast based on the difference between their atomic numbers, so that an image reflecting a layered structure as shown in FIG. 3 can be easily obtained. Such a compositional backscattered electron image makes it possible to measure the thickness of the LiF crystal layer and to evaluate the unidirectionality of the $CaF_2$ crystal layer. In measuring the thickness of the LiF crystal layer, the length measuring function of SEM is used for conducting measurement while making a correction using a standard grid whose spacing length is known.

The identification of the crystal phases constituting the eutectic body can be made by powder X-ray diffraction measurement. By making the powder X-ray diffraction measurement of a powder formed by pulverizing the eutectic body and analyzing a diffraction pattern obtained, the eutectic body is identified as a eutectic body composed of LiF crystals and $CaF_2$ crystals.

The eutectic body obtained by the above production method has satisfactory processability, and can be processed into a desired shape to form a neutron scintillator according to the present invention. The shape of the neutron scintillator may be any shape, including the shape of a plate, a block, or an array of rectangular columns of eutectic body. In processing the eutectic body, a cutter such as a blade saw or a wire saw, a grinder or an abrasive wheel, which is publicly known, can be used without limitation.

A neutron scintillator comprising the eutectic body of the present invention is combined with a photodetector such as a photomultiplier tube (PMT), whereby a neutron detector can be constituted. With this neutron detector, scintillation light emitted from the neutron scintillator upon irradiation with neutrons is converted into an electrical signal by the photomultiplier tube, whereby the presence and flux of neutrons can be grasped as the electrical signal. Scintillation light emitted by the neutron scintillator of the present invention is light with a wavelength of about 300 to 350 nm, and the photomultiplier tube capable of detecting light in this region can be used particularly preferably. Specific examples of such a photomultiplier tube are R7600U and H7416 produced by HAMAMATSU PHOTONICS K.K. No limitations are imposed on the structure and the method of preparation of the neutron detector, and publicly known structures and methods can be adopted.

A concrete example of the method is to adhere the neutron scintillator of the present invention to the photoelectric surface (photocathode) of the photomultiplier tube with the use of an optical grease or the like, apply a high voltage to the photomultiplier tube, and measure an electrical signal outputted by the photomultiplier tube. In order to analyze the flux of the neutron beam, etc. by utilizing the electrical signal from the photomultiplier tube, an amplifier, a multi-channel analyzer (MCA) or the like may be provided at a stage subsequent to the photomultiplier tube.

The neutron scintillator composed of the eutectic body according to the present invention can be combined with a position-sensitive photodetector to construct a neutron imaging device. As the position-sensitive photodetector, a position-sensitive PMT can be preferably used. Its examples include XP85012 produced by PHOTONIS INC.

EXAMPLES

Hereinbelow, the present invention will be described specifically by reference to its Examples, but the present invention is in no way limited by these Examples. Moreover, not all of combinations of the features described in the Examples are essential to the means for solution to problems that the present invention adopts.

Example 1

Production of Eutectic Body

Lithium fluoride (331 g), calcium fluoride (258 g), and europium fluoride (3.45 g), as starting materials, were mixed to prepare a material mixture. Each starting material used was a powder with purity of 99.99% or more. As lithium fluoride, a material having a $^6$Li-isotope ratio of 95% was used. The component ratio between lithium fluoride and calcium fluoride in the material mixture was 0.8 mol lithium fluoride: 0.2 mol calcium fluoride, and the amount of europium, as a luminescence center element, contained in $CaF_2$ crystals was 0.5 mol % with respect to $CaF_2$.

Then, the material mixture was charged into a crucible formed of carbon and having an internal diameter of 60 mm, and the crucible was installed in a chamber equipped with a resistance heating type heater, a heat insulator, and a vacuum evacuator. Using the vacuum evacuator, the interior of the chamber was evacuated to $2.0 \times 10^{-4}$ Pa or lower. Then, a high purity argon gas mixed with 5 vol % tetrafluoromethane was introduced into the chamber for a gas exchange operation. The pressure within the chamber after the gas exchange operation was atmospheric pressure.

After the gas exchange operation was performed, the material mixture was heated by the heater until it was melted. The heater and the heat insulator were disposed such that a temperature gradient in the solidification direction was 2.5° C./mm, and the output of the heater was adjusted such that the temperature at the bottom of the crucible was 830° C.

Then, the melt of the material mixture melted was continuously lowered together with the crucible to solidify the melt unidirectionally from below to above. In the present embodiment, the rate at which the melt was lowered, namely, the solidification rate, was set at 10 mm/hr. By this procedure, the melt was totally solidified to obtain a eutectic body used in the present invention.

Figure 4:
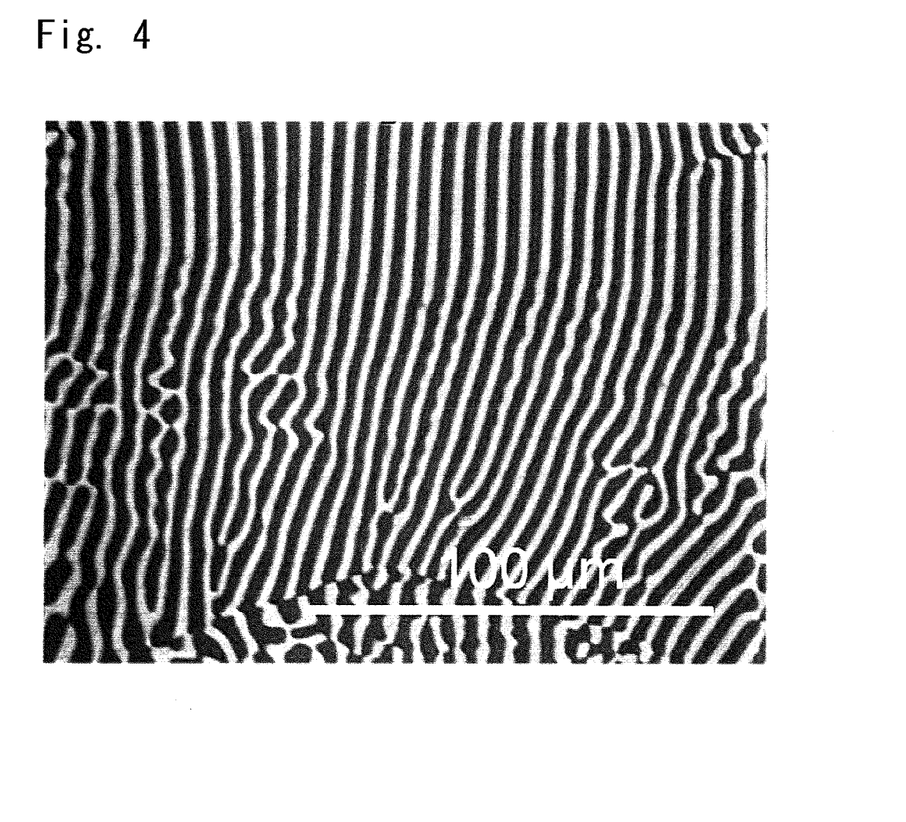
FIG. 4 is a compositional backscattered electron image of a cut surface of the eutectic body obtained in Example 1 when the eutectic body was cut in a direction perpendicular to the solidification direction.

The resulting eutectic body was cut in a direction parallel to the solidification direction and in a direction perpendicular to the solidification direction by a wire saw provided with a diamond wire, and the cut surface was mirror polished. A compositional backscattered electron image of the surface when cut in the direction parallel to the solidification direction is shown in FIG. 3. A compositional backscattered electron image of the surface when cut in the direction perpendicular to the solidification direction is shown in FIG. 4. Bright parts of the compositional backscattered electron images represent $CaF_2$ crystal layers, while dark parts of the compositional backscattered electron images represent LiF crystal layers.

FIG. 3 shows that the $CaF_2$ crystal layers were linearly continuous in one direction. In connection with the compositional backscattered electron image of FIG. 4, the thickness of the LiF crystal layer was measured using the length measuring function of the SEM. The thickness of the layer of LiF in the eutectic body was found to be 3 μm. In measuring the thickness of the LiF crystal layer, calibration was performed using a standard grid with a spacing length of 25 μm to carry out a measurement.

Figure 5:
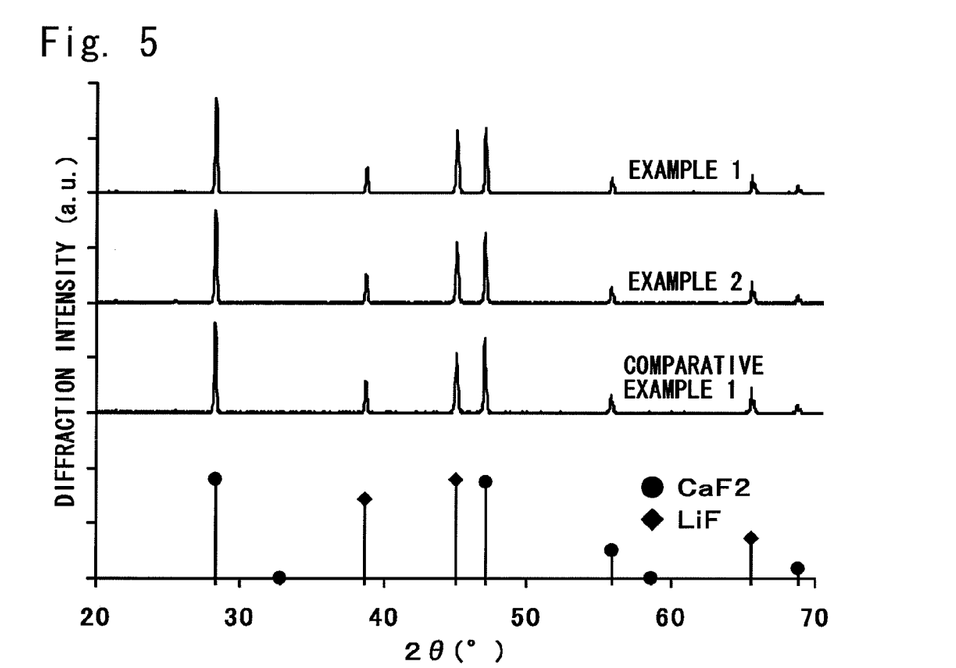
FIG. 5 shows the powder X-ray diffraction patterns of eutectic bodies obtained in Example 1, Example 2 and Comparative Example 1.

The resulting eutectic body was pulverized to form a powder, which was subjected to powder X-ray diffraction measurement, whereby the crystal phases were identified. "D8 DISCOVER" produced by Bruker AXS K.K. was used as a measuring device. A diffraction pattern obtained is shown in FIG. 5. From FIG. 5, diffraction peaks attributed to LiF crystals and $CaF_2$ crystals were confirmed, showing that the eutectic body was a eutectic body composed of LiF crystals and $CaF_2$ crystals.

Preparation of Neutron Scintillator

The resulting eutectic body was cut by a wire saw provided with a diamond wire, and was then ground and mirror polished to be processed into a shape 7 mm in length, 2 mm in width, and 1 mm in thickness. In this manner, a neutron scintillator according to the present invention was obtained. Processing was performed such that a surface of this neutron scintillator, 7 mm long and 2 mm wide, was a surface perpendicular to the solidification direction of the eutectic body, whereby the end, in the direction of linear continuation, of the laminar calcium fluoride crystals was positioned within this surface.

Preparation and Characteristics Evaluation of Neutron Detector

The response characteristics of the neutron scintillator (i.e., response to neutrons) were evaluated by the following method:

The surface of the neutron scintillator, measuring 7 mm in length and 2 mm in width, was coupled to the window, on which photocathode is coated, of the photomultiplier tube (R7600U produced by HAMAMATSU PHOTONICS K. K.) with the use of an optical grease to produce a neutron detector.

The neutron detector was covered with a light shield made of a black vinyl sheet so that external light would not enter the photocathode of the photomultiplier tube. Then, the neutron scintillator was irradiated with neutrons from $^{252}$Cf with radioactivity of 1 MBq, the neutrons being moderated via a neutron moderator comprising a polyethylene block having a thickness of 40 mm.

To measure scintillation light emitted from the neutron scintillator, a high voltage of 800V was applied from a power supply line to the photomultiplier tube, and scintillation light was converted into an electrical signal, which was outputted from a signal output line. The electrical signal outputted from the photomultiplier tube is a pulsed signal reflecting the scintillation light, and the pulse height of the pulsed signal represents the light emission intensity of scintillation light. Such electrical signals outputted from the photomultiplier tube were shaped and amplified by a shaping amplifier, and then entered into a multichannel pulse height analyzer to analyze them and prepare a pulse height spectrum.

Figure 6:
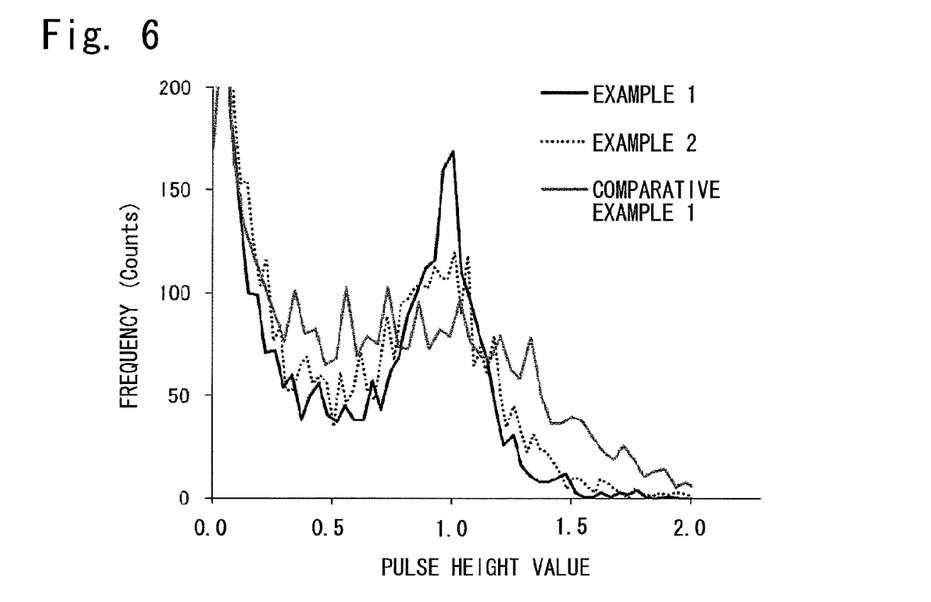
FIG. 6 shows the pulse height spectra of neutron scintillators of Example 1, Preparation Example 1 of Example 2, and Comparative Example 1 when irradiated with neutrons.

The resulting pulse height spectrum is shown in FIG. 6. The abscissa of the pulse height spectrum represents the pulse height value of the electrical signal, namely, the light emission intensity of the scintillation light. The pulse height value was expressed as a relative value with respect to the peak value of the pulse height spectrum defined as 1. The ordinate represents the frequency of the electrical signal showing each pulse height value. The frequency was expressed as the counts of the detected electrical signals.

Clear peaks indicating the detection of neutrons were confirmed from FIG. 6. Thus, it has been found that the eutectic body of the present invention acts effectively as a neutron scintillator, and that a neutron detector using the neutron scintillator is effective. In FIG. 6, the peaks showing the detection of neutrons can be clearly distinguished from gamma-ray noises present in a region with low pulse height values. Hence, the gamma-ray noises can be easily eliminated, for example, by taking the pulse height value of 0.5 as a threshold value, removing electrical signals of pulse height values below the threshold value, and selecting only electrical signals of pulse height values exceeding the threshold value. That is, the neutron scintillator of the present invention has been found to have excellent n/γ discrimination ability.

Example 2

Production of Eutectic Body

Figure 7:
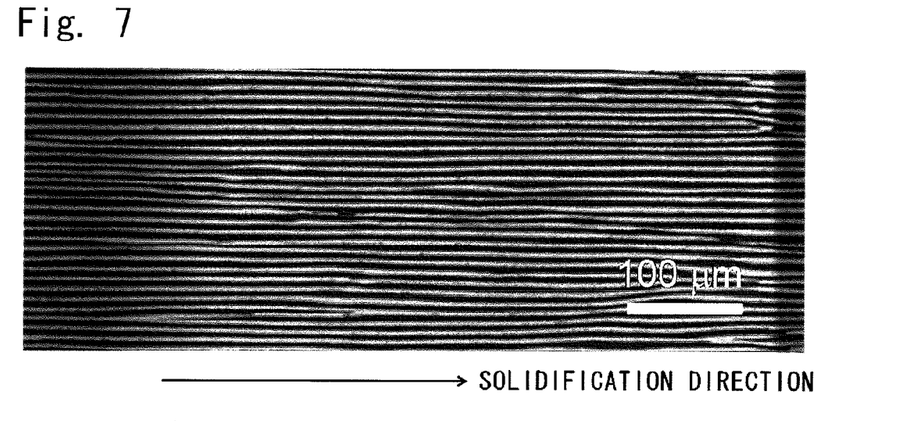
FIG. 7 is a compositional backscattered electron image of a cut surface of the eutectic body obtained in Example 2 when the eutectic body was cut in a direction parallel to a solidification direction.
Figure 8:
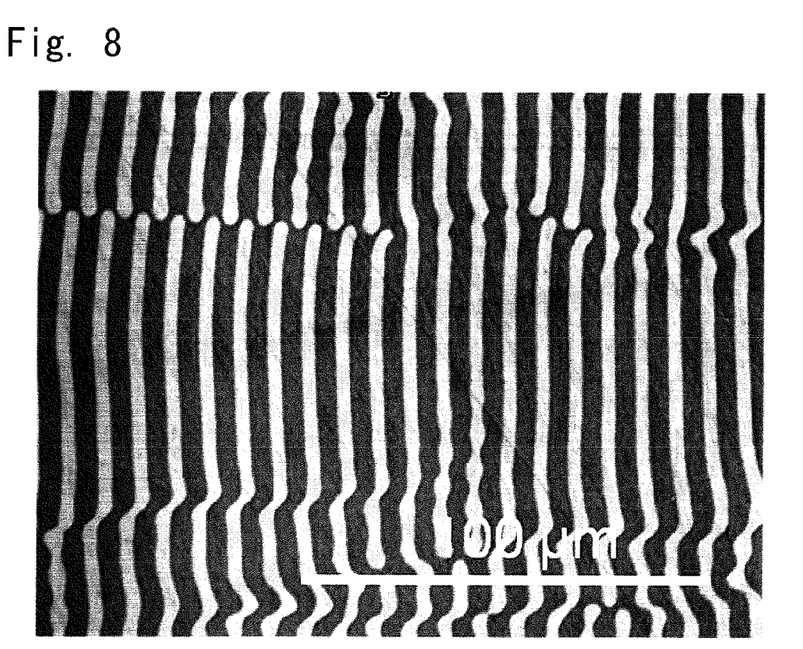
FIG. 8 is a compositional backscattered electron image of a cut surface of the eutectic body obtained in Example 2 when the eutectic body was cut in a direction perpendicular to the solidification direction.

A eutectic body was obtained in the same manner as in Example 1, except that the solidification rate was set at 3 mm/hr. The resulting eutectic body was observed for a compositional backscattered electron image in the same manner as in Example 1. A compositional backscattered electron image of a surface of the eutectic body when cut in a direction parallel to the solidification direction is shown in FIG. 7. A compositional backscattered electron image of a surface of the eutectic body when cut in a direction perpendicular to the solidification direction is shown in FIG. 8.

FIG. 7 shows that $CaF_2$ crystal layers were linearly continuous in one direction. In connection with the compositional backscattered electron image of FIG. 8, the thickness of the LiF crystal layer was measured using the length measuring function of the SEM. The thickness of the layer of LiF in the eutectic body was found to be 4 μm. Powder X-ray diffraction measurement was performed in the same manner as in Example 1 to identify the crystal phases. A diffraction pattern obtained is shown in FIG. 5. From FIG. 5, diffraction peaks attributed to LiF crystals and $CaF_2$ crystals were confirmed, showing that the eutectic body was a eutectic body composed of LiF crystals and $CaF_2$ crystals.

Preparation of Neutron Scintillator

The resulting eutectic body was processed in the same manner as in Example 1 to obtain a neutron scintillator according to the present invention. In the present Example, the neutron scintillators were prepared in the following two manners: As in Example 1, processing was performed such that a surface of the neutron scintillator, 7 mm long and 2 mm wide, became a surface perpendicular to the solidification direction, whereby the end, in the direction of linear continuation, of the laminar calcium fluoride crystals was within this surface (Preparation Example 1). On the other hand, processing was performed such that a surface of the neutron scintillator, 7 mm long and 2 mm wide, became a surface parallel to the solidification direction Preparation Example 2

Preparation and Characteristics Evaluation of Neutron Detector

Figure 9:
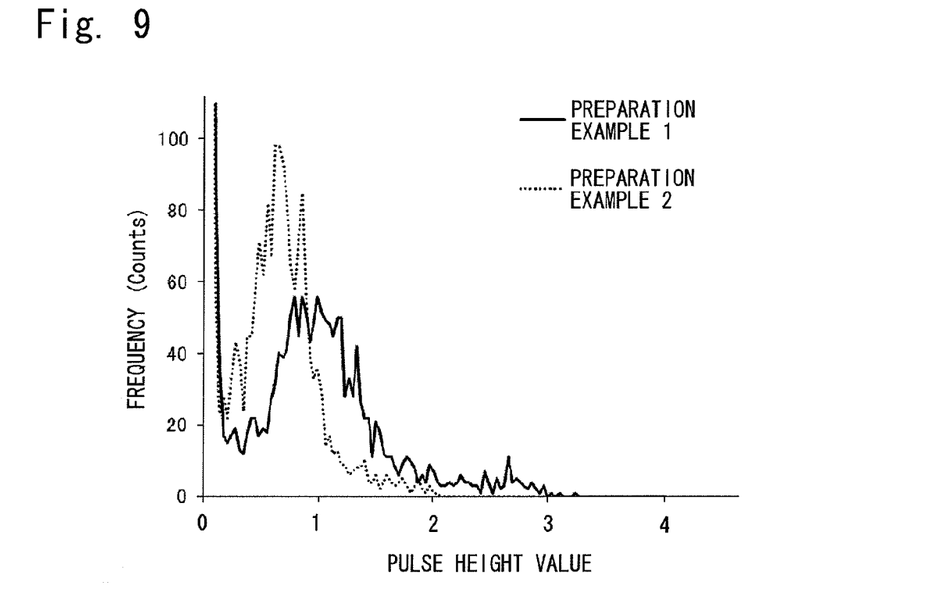
FIG. 9 shows the pulse height spectra of the neutron scintillators of Preparation Example 1 and Preparation Example 2 of Example 2 when irradiated with neutrons.

The response characteristics of the neutron scintillator (i.e., response to neutrons) were evaluated in the same manner as in Example 1. FIG. 6 shows a pulse height spectrum obtained when the neutron scintillator of Preparation Example 1 was used. FIG. 9 shows, and compares, pulse height spectra obtained when the neutron scintillators of Preparation Example 1 and Preparation Example 2 were used.

Clear peaks indicating the detection of neutrons were confirmed from FIG. 6. Thus, it has been found that the eutectic body of the present invention acts effectively as a neutron scintillator, and that a neutron detector using the neutron scintillator is effective. As in Example 1, the peaks showing the detection of neutrons can be clearly distinguished from gamma-ray noises. Hence, the neutron scintillator of the present invention has been found to have excellent n/γ discrimination ability.

The pulse height spectra obtained when the neutron scintillators of Preparation Example 1 and Preparation Example 2 were used are shown in FIG. 9 for purposes of comparison. In this drawing, the pulse height values in both of Preparation Example 1 and Preparation Example 2 are expressed as relative values, with the peak value of the pulse height spectrum of Preparation Example 1 being taken as 1. FIG. 9 shows that when the photodetector was disposed at the end, in the linear direction, of the linearly continuous calcium fluoride crystal layers (Preparation Example 1), the peak value remarkably decreased in comparison with a case where the photodetector was not disposed in such a way. This effect is considered to result from the fact that the propagation efficiency of scintillation light was high in the direction of linear continuation of $CaF_2$ crystals, so that the detection efficiency of scintillation light in the photodetector increased. This is an effect characteristic of a scintillator composed of a eutectic body, and demonstrates that the present invention is effective.

Comparative Example 1

Production of Eutectic Body

Figure 10:
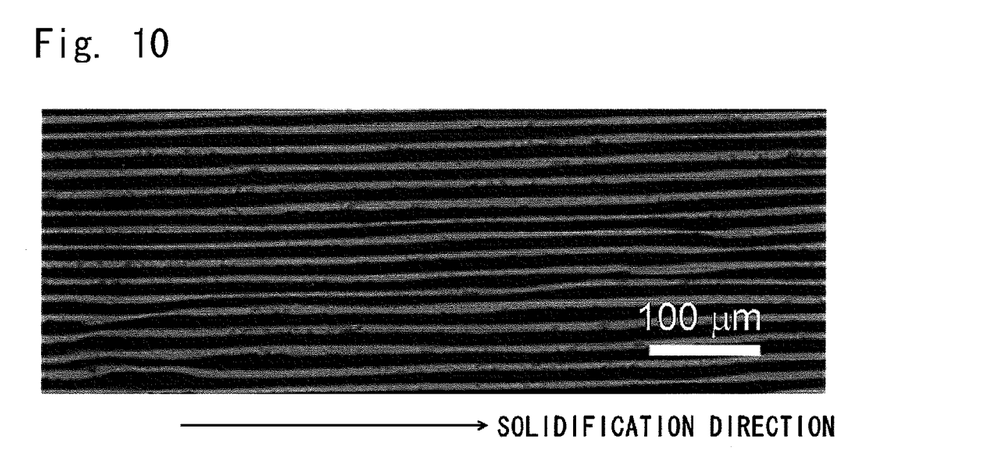
FIG. 10 is a compositional backscattered electron image of a cut surface of the eutectic body obtained in Comparative Example 1 when the eutectic body was cut in a direction parallel to a solidification direction.
Figure 11:
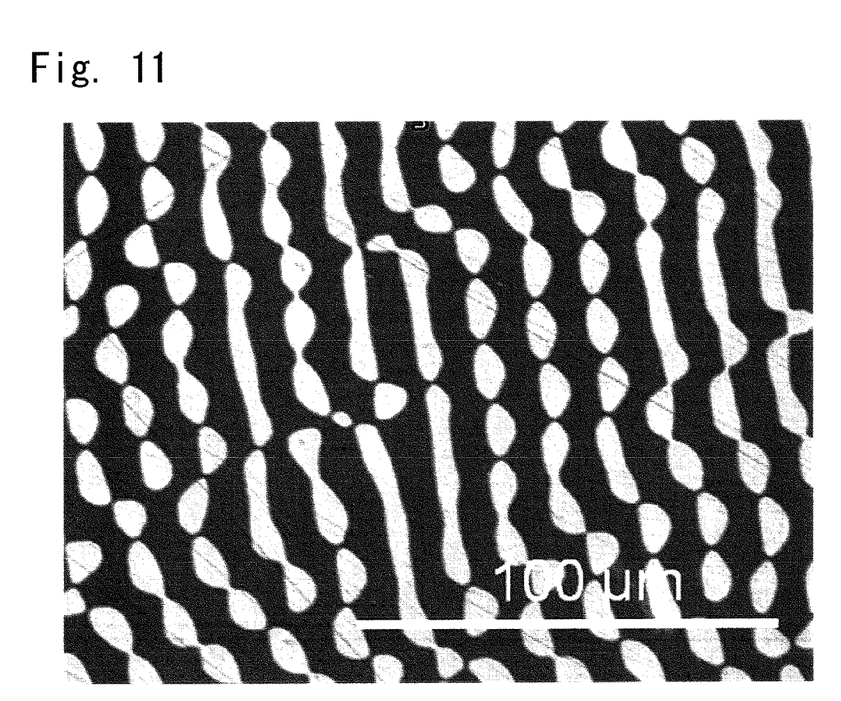
FIG. 11 is a compositional backscattered electron image of a cut surface of the eutectic body obtained in Comparative Example 1 when the eutectic body was cut in a direction perpendicular to the solidification direction.

A eutectic body was obtained in the same manner as in Example 1, except that the solidification rate was set at 1 mm/hr. The resulting eutectic body was observed for a compositional backscattered electron image in the same manner as in Example 1. A compositional backscattered electron image of a surface of the eutectic body when cut in a direction parallel to the solidification direction is shown in FIG. 10. A compositional backscattered electron image of a surface of the eutectic body when cut in a direction perpendicular to the solidification direction is shown in FIG. 11.

FIG. 10 shows that $CaF_2$ crystal layers were linearly continuous in one direction. In connection with the compositional backscattered electron image of FIG. 11, the thickness of the LiF crystal layer was measured using the length measuring function of SEM. The thickness of the layer of LiF in the eutectic body was found to be 7 μm. Powder X-ray diffraction measurement was performed in the same manner as in Example 1 to identify the crystal phases. A diffraction pattern obtained is shown in FIG. 5. From FIG. 5, diffraction peaks attributed to LiF crystals and $CaF_2$ crystals were confirmed, showing that the eutectic body was a eutectic body composed of LiF crystals and $CaF_2$ crystals.

Preparation of Neutron Scintillator

The resulting eutectic body was processed in the same manner as in Example 1 to obtain a neutron scintillator.

Preparation and Characteristics Evaluation of Neutron Detector

The response characteristics of the neutron scintillator (i.e., response to neutrons) were evaluated in the same manner as in Example 1. A pulse height spectrum obtained is shown in FIG. 6. FIG. 6 reveals that peaks showing the detection of neutrons were broader than those for the neutron scintillator of the present invention. This finding shows that when the thickness of the LiF crystal layer exceeds 5 μm, discrimination from noises is difficult.

The invention claimed is:

1. A neutron scintillator comprising a eutectic body composed of laminar lithium fluoride crystals and laminar calcium fluoride crystals alternately arranged in layers, wherein thickness of the lithium fluoride crystal layers in the eutectic body is 0.1 to 5 μm.

2. A neutron detector comprising the neutron scintillator according to claim 1, and a photodetector.

3. The neutron detector according to claim 2, wherein the photodetector is a position-sensitive photodetector.

4. A neutron scintillator comprising a eutectic body composed of laminar lithium fluoride crystals and laminar calcium fluoride crystals alternately arranged in layers, wherein the calcium fluoride crystal layers in the eutectic body are linearly continuous in at least one direction.

5. A neutron detector comprising the neutron scintillator according to claim 4, and a photodetector.

6. The neutron detector according to claim 5, wherein the photodetector is disposed at an end, in a linear direction, of the linearly continuous calcium fluoride crystal layers.

7. The neutron detector according to claim 5, wherein the photodetector is a position-sensitive photodetector.

8. A neutron scintillator comprising a eutectic body composed of laminar lithium fluoride crystals and laminar calcium fluoride crystals alternately arranged in layers, wherein thickness of the lithium fluoride crystal layers in the eutectic body is 0.1 to 5 μm, and the calcium fluoride crystal layers are linearly continuous in at least one direction.

9. A neutron detector comprising the neutron scintillator according to claim 8, and a photodetector.

10. The neutron detector according to claim 9, wherein the photodetector is disposed at an end, in a linear direction, of the linearly continuous calcium fluoride crystal layers.

11. The neutron detector according to claim 9, wherein the photodetector is a position-sensitive photodetector.

* * * * *